United States Patent [19]
Peters

[11] 3,979,042
[45] Sept. 7, 1976

[54] VACUUM BRAZING OF NICKEL TO ALUMINUM

[75] Inventor: Bruce J. Peters, Hanover, Mass.

[73] Assignee: Raytheon Company, Lexington, Mass.

[22] Filed: Jan. 16, 1975

[21] Appl. No.: 541,534

[52] U.S. Cl. .............................. 228/183; 228/221; 228/263; 29/197
[51] Int. Cl.² ......................................... B23K 1/04
[58] Field of Search .......... 228/263, 183, 219, 221, 228/205, 208, 200; 29/197

[56] References Cited
UNITED STATES PATENTS

| | | | |
|---|---|---|---|
| 2,920,385 | 1/1960 | Fike et al. ........................ | 228/205 X |
| 3,373,483 | 3/1968 | Miller .................................. | 228/221 |
| 3,375,570 | 4/1968 | Dubusker et al. ............... | 228/200 X |
| 3,482,305 | 12/1969 | Dockus et al. .................... | 228/263 X |
| 3,675,310 | 7/1972 | Schwaneke et al. ............. | 228/208 X |
| 3,703,758 | 11/1972 | Beck, Jr. .......................... | 228/183 X |

OTHER PUBLICATIONS

Fenton, Ed. *Brazing Manual* pp. 31, 38, 39, 131 and 139 American Welding Soc. N.Y., N.Y. 1963.

Primary Examiner—Al Lawrence Smith
Assistant Examiner—K. J. Ramsey
Attorney, Agent, or Firm—John R. Inge; Joseph D. Pannone; Milton D. Bartlett

[57] ABSTRACT

A method for brazing nickel to aluminum in a vacuum and product produced thereby. The outer surface of the aluminum member to which the nickel member is to be brazed is precoated with a layer containing silicon and magnesium. The nickel and aluminum members are placed together in an oven at reduced pressures and heated to a temperature of approximately 593°C cracking the oxide coating upon the aluminum sheet. The presence of magnesium and silicon in the surface of the aluminum sheets makes possible an excellent braze with a large filleted area. The process may be further adapted for brazing other metal components to aluminum by first precoating the component with nickel.

15 Claims, 4 Drawing Figures

VACUUM BRAZING OF NICKEL TO ALUMINUM

The Invention herein described was made in the course of or under a contract or subcontract thereunder with the Department of Defense.

BACKGROUND OF THE INVENTION

1. Field of the Invention:

The invention pertains to the brazing together of metal members. More specifically, the invention pertains to the brazing of nickel to aluminum and particularly nickel tubing to an aluminum sheet or base.

2. Description of the Prior Art:

Historically aluminum has been a difficult metal to which to braze. In brazing either aluminum to aluminum or another metal to aluminum the fundamental problem encountered is the presence of an aluminum oxide coating upon the outside surface of the aluminum members. Such a coating is formed spontaneously when the surface of the newly formed aluminum member is exposed to the atmosphere as aluminum is a highly reactive metal. The aluminum oxide coating prevents the brazing metal from wetting the surface of the aluminum member thereby preventing a tight metallic bond being formed therewith. Hence, in any practical brazing process the aluminum oxide must first be removed before the brazing operation can be performed.

The most common prior method for brazing either aluminum or another metal to aluminum was with the use of a process termed flux brazing. In this process, the aluminum member was immersed in a bath of molten salt and brazing flux which removed the aluminum oxide coating so that the surface of the aluminum could be wetted with the brazing flux. In the case of brazing nickel to aluminum, the aluminum member was additionally caustically etched. Also, typically the nickel member was grit-cleaned with silicon carbide and pickled with nitric acid prior to brazing. Both aluminum and nickel members were usually preheated prior to immersion in the bath of molten salt and brazing flux.

Flux brazing of nickel to aluminum was further complicated by the requirement for a low fluoride content in the molten salt. It has been found experimentally that low fluoride content is required in order to achieve a sufficiently wide fillet needed for good heat transfer between nickel and aluminum members. Furthermore, it has been difficult to achieve strong brazed joints with good heat transfer characteristics because of the tendency of the brazed structures to entrap flux at the brazed joint depite the most vigorous efforts to control the process. Presence of the flux in the brazed joint causes large non-brazed areas in the joint which further can become a point of corrosion between the two metals. The corrosion problem is further enhanced by the inherent differences in electropotential between the two metals.

Aluminum has been successfully brazed to aluminum using a fluxless brazing process which is performed in either a vacuum or an inert atmosphere. Such a process is described in U.S. Pat. Nos. 3,321,828, 3,322,517, 3,373,482, and 3,373,483 and to C. J. Miller. In the described process, the two aluminum members to be joined are provided at the juncture therebetween the elements aluminum, magnesium, and silicon. These elements can be present as brazing sheets clad to one or the other of the members, a brazing powder mixture, or as sheet, strip, or wire inserts between the two aluminum members. The members and the brazing material are put in an evacuated oven and heated to a temperature of approximately 550°C until a braze forms.

SUMMARY OF THE INVENTION

Accordingly, it is the primary object of the present invention to provide a method for brazing nickel to aluminum without the use of a flux brazing process.

Moreover, it is an object of the present invention to provide an inexpensive and rapid method for brazing nickel and aluminum members.

Furthermore, it is an object of the present invention to produce an article of nickel brazed to aluminum with a strong and large filleted joint therebetween to facilitate rapid heat transfer between the two members.

It is also an object of the present invention to provide a brazing method for joining nickel to aluminum in which cleaning procedures are minimized.

These as well as other objects of the invention are met by the method comprising the steps of assembling the nickel and aluminum members or components in contact with one another and providing at the juncture therebetween the elements of aluminum, magnesium, and silicon. The members to be brazed are heated in a non-reactive atmosphere, preferably in a vacuum furnace which is pumped down to a low pressure. The members are heated to a preferred temperature of 593 ±3°C until the members are brazed together. The furnace is then cooled and atmospheric pressure restored at a rate chosen to minimize mechanical distortion of the component parts. Heat treating may be further applied as required. Only a minimal amount, if any, precleaning is required prior to the vacuum brazing process. The aluminum, magnesium, and silicon elements present at the juncture between the nickel and aluminum members are preferably provided by pre-cladding the aluminum sheet with an alloy containing 5 to 15% by weight silicon, 1 to 2% by weight magnesium, and the remainder aluminum. Such a cladding may be provided on one or both sides of the aluminum sheet.

The invention has been found useful in a number of practical applications. In a heat exchanger used for cooling printed circuit boards such as would be used in aircraft or missile applications heat transfer between an aluminum frame and nickel tubing containing a coolant fluid is greatly facilitated by use of the present invention. In another class of applications, materials other than nickel and aluminum and particularly copper, steel, ferrous alloys, ceramic materials, and titanium may be brazed to aluminum by first precoating the other material with nickel, then brazing the nickel coating to the aluminum member.

DESCRIPTION OF THE PREFERRED EMBODIMENT

A number of present-day heat exchanger applications require the use of nickel tubing joined to aluminum substrates or sheets to form an enclosure for heat generating components. In such a heat exchanger, the heat generated by the components is conveyed to the aluminum frame. Aluminum is chosen for the frame for its light weight, low cost, and ease of fabrication while nickel is used for the cooling tubing because of its combined strength at elevated temperatures and resistance to corrosion. A cooling fluid is made to flow through the nickel tubing. A strong and highly heat conductive braze is required between the nickel tubing and aluminum frame to insure rapid and complete heat transfer from the aluminum frame to the nickel tubing and hence to the cooling fluid.

Figure 1:
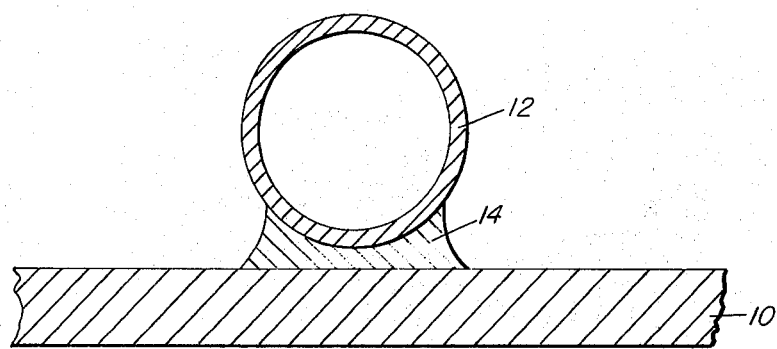
FIG. 1 is a cross-sectional view of a nickel tube brazed to an aluminum sheet in accordance with the present invention.

In FIG. 1 is shown a cross-sectional view of a nickel tube 12 joined to an aluminum sheet 10 by a solid section of brazing material 14. To produce a good braze sufficient for the aforementioned heat exchanger applications, the braze must have a uniform fillet so that no hot or cold spots appear along the length of the nickel tubing to permit uniform cooling throughout the aluminum frame. The braze should have a smooth, solid fillet which tapers to a feathered edge as it meets the aluminum sheet. All the brazing material must have melted during the brazing process. Additionally, there should be no cracks, blisters, undercoating, or corrosion along the length of the braze. It has been found that the use of the process in accordance with the present invention produces such a braze.

Figure 2:
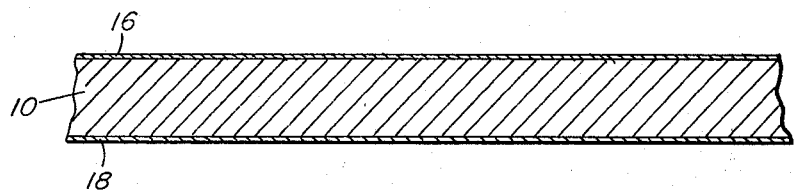
FIG. 2 is a cross-sectional view of an aluminum sheet preprocessed for use with the present invention.
Figure 4:
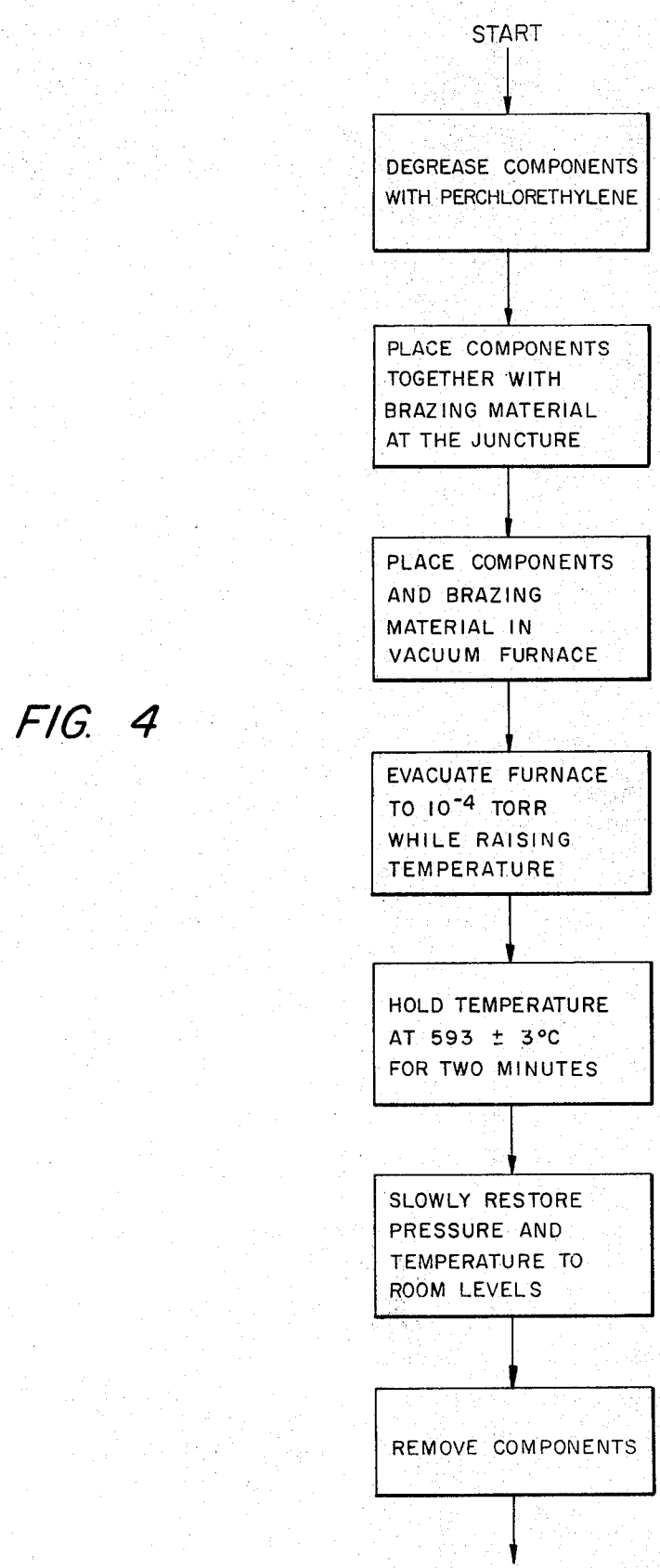
FIG. 4 is a flow diagram of a brazing process in accordance with the invention.

A method for brazing nickel components to aluminum is shown in the flow diagram of FIG. 4. Both the nickel and aluminum components are degreased, preferably with perchlorethylene. No further cleaning of the components is required after this initial degreasing although it has been found advisable to handle the components with white gloves to avoid contamination by fingerprints. The components are then assembled in the configuration in which they are to be brazed with the brazing material provided at the juncture therebetween. The brazing material is a combination of magnesium, silicon, and aluminum containing preferably 5 to 15% by weight silicon and 1 to 2% by weight magnesium the balance being aluminum. The brazing material may be provided as a powder or ribbon inserted between the two components being brazed. In an alternative and preferred embodiment, the brazing material is preclad to the aluminum sheet as shown in FIG. 2. Therein aluminum sheet 10 has clad on both sides thereof brazing sheets 16 and 22. Aluminum sheet 10 may be clad on one or both sides as required. Aluminum alloy type 6061 or 6951, obtainable from Reynolds Metals Co., Richmond, Virginia, is the preferred material for aluminum sheet 10. The brazing cladding is preferably X4004 cladding again obtainable from Reynolds Metals Co. X4004 preclad to 6951 alloy is obtainable from Reynolds Metals Co. as alloy X14.

The joined components along with the brazing material are then placed in a vacuum furnace. The furnace is evacuated by pumping down to a pressure of approximately $10^{-4}$ torr while the temperature is simultaneously raised to $593 \pm 3°C$ ($1100 \pm 5°F$). This temperature is chosen because it is above the melting point of the brazing material yet below the melting of types 6951 and 6061 aluminum and nickel. The components are held at the preferred temperature for a time period of approximately two minutes during which time the braze forms between the components. The components and newly formed braze are then quenched by slowly restoring the pressure and temperature to room levels. The cooling rate is chosen to minimize mechanical distortion of the components. The components may then be removed from the furnace and used directly without any further cleaning operation.

During the heating process the aluminum base expands at a greater rate than its aluminum oxide coating thereby cracking and creating fissures in the coating. Because of the vacuum in the furnace there is no oxygen present to react with the exposed aluminum and to thereby fill the fissures with new aluminum oxide. Magnesium vapors from the brazing material acts as a getter for the oxide and for any remaining water vapor. The melting brazing metal can then undermine the remaining oxide and lift it off while simultaneously wetting the surface of the aluminum. Nickel aluminide forms as the intermetallic compound. Silicon is present as a matrix material to further strengthen the braze.

Figure 3:
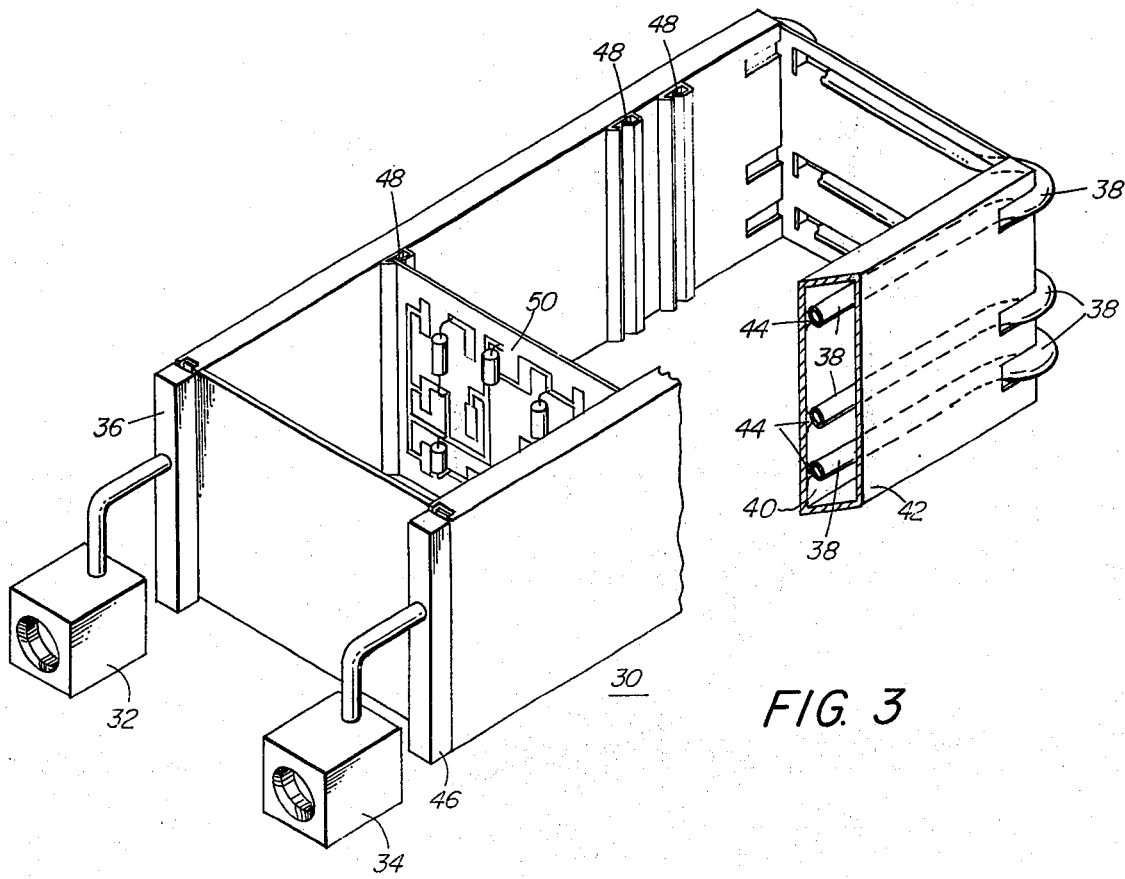
FIG. 3 is a prospective view with a partially cut away portion of a heat exchanger in which the present invention is used to advantage.

FIG. 3 shows a partially cut away perspective view of a heat exchanger 30 in which the present invention is used to advantage. This particular heat exchanger is adapted for use with printed circuit cards as would be used in a missile or airborne guidance system. Such printed circuit cards generally dissipate large amounts of heat which must be removed for the circuits to continue to properly function. The frame consists of inner and outer aluminum sheets 40 and 42. Printed circuit card holders 48 attached to aluminum sheet 40 provide support for printed circuit cards 50. Nickel cooling tubes 38 are brazed to the outer surface of inner aluminum sheet 40 by the process in accordance with the present invention. The influent cooling fluid is furnished through input coupling 32 and input manifold 36 to one end of cooling tubes 38. The effluent cooling fluid which has absorbed heat from the printed circuit cards through the aluminum sheet 40 and nickel tubes 38 is collected by output manifold 48 and coupled out through output coupling 34. It has been found that with the use of the present invention heat flow away from the printed circuit cards is greatly improved making it possible to operate the electronic circuitry contained within heat exchanger 30 at a higher power level than was heretofore possible, or alternatively operate the electronic components at a lower temperature to thereby increase their expected service life.

Although preferred embodiments of the invention have been described numerous modifications and alterations thereto would be apparent to one having ordinary skill in the art without departing from the spirit and scope of the invention. In particular, the invention may be used for brazing together other than nickel tubing and aluminum sheets. Any shaped members of nickel and aluminum can be brazed together with the invention. Also, other metals can be brazed together by first plating the other metal or metals with nickel or aluminum, then brazing together the nickel and aluminum in accordance with the invention.

I claim:
1. The method comprising the steps of:
   providing members or predominantly nickel and aluminum or alloy of aluminum;
   assembling said members in a preferred configuration;

providing a brazing material at junctures between said members, said brazing material comprising aluminum, silicon, and magnesium;

providing a non-reactive atmosphere around the assembled members; and heating said members until a braze forms therebetween.

2. The method of claim 1 further comprising the step of lowering the temperature of said members at a predetermined rate.

3. The method of claim 2 wherein said non-reactive atmosphere comprises a partial vacuum of no more than $10^{-4}$ torr.

4. The method of claim 2 wherein said members are heated to a temperature in the range of 590°C to 596°C.

5. The method comprising the steps of:
providing one or more members each of predominantly nickel and aluminum or alloy of aluminum;
assembling said members in a preferred configuration;
providing brazing material at junctures between said members, said brazing material comprising 5 to 15% by weight silicon, 1 to 2% by weight magnesium, the remainder being aluminum;
placing the assembled members in a vacuum furnace;
lowering the pressure in said furnace to $10^{-4}$ torr or lower;
raising the temperature of said members and brazing material to within the range of 590°C to 596°C;
maintaining said temperature for a predetermined period of time;
lowering said temperature to room temperature;
raising said pressure to room pressure; and
removing said members from said vacuum furnace.

6. The method of claim 5 wherein said brazing material is preclad to said one or more aluminum members.

7. The method of claim 6 wherein said predetermined period of time is approximately two minutes.

8. The method of claim 6 wherein said one or more nickel members comprise tubing.

9. The method of claim 6 further comprising the step of precleaning said members.

10. The method of claim 9 wherein said members are precleaned with perchlorethylene.

11. The method of claim 6 wherein the step of lowering said temperature comprises lowering said temperature at a predetermined rate.

12. The method of claim 11 wherein said predetermined rate is chosen to minimize mechanical distortion of the brazed members.

13. A product having nickel and aluminum or alloy of aluminum members, said members being brazed together at junctures therebetween by the method comprising the steps of:
providing said members of predominantly nickel and aluminum or alloy of aluminum;
assembling said members in a preferred configuration;
providing brazing material at said junctures, said brazing material comprising 5 to 15% by weight silicon, 1 to 2% by weight magnesium, the remainder being aluminum;
placing the assembled members in a vacuum furnace;
lowering the pressure in said furnace to $10^{-4}$ torr or lower;
raising the temperature of said members and said brazing material to within the range of 590°C to 596°C;
maintaining said temperature for a predetermined period of time;
lowering said temperature to room temperature;
raising said pressure to room pressure; and
removing said members from said vacuum furnace.

14. The product of claim 13 wherein said product comprises a heat exchanger, said nickel members comprise tubing and said aluminum members comprise aluminum sheet.

15. The product of claim 14 wherein said aluminum sheet is preclad before brazing with said brazing material.

* * * * *